(12) United States Patent
Cha

(10) Patent No.: US 7,109,618 B2
(45) Date of Patent: Sep. 19, 2006

(54) MOTOR

(75) Inventor: Hyun Rok Cha, Gwangju (KR)

(73) Assignee: Samsung Gwangju Electronics Co., Ltd., Gwangju-City (KR)

( * ) Notice: Subject to any disclaimer, the term of this patent is extended or adjusted under 35 U.S.C. 154(b) by 193 days.

(21) Appl. No.: 10/814,307

(22) Filed: Mar. 31, 2004

(65) Prior Publication Data

US 2005/0118886 A1    Jun. 2, 2005

(30) Foreign Application Priority Data

Nov. 28, 2003    (KR) ................. 10-2003-0085709

(51) Int. Cl.
*H02K 3/50* (2006.01)
*H02K 3/52* (2006.01)
*H02K 15/00* (2006.01)

(52) U.S. Cl. ............... 310/71; 310/43; 29/596; 439/884

(58) Field of Classification Search ............ 310/43, 310/68 R, 71, 89; 29/596; 439/404, 417, 439/884

See application file for complete search history.

(56) References Cited

U.S. PATENT DOCUMENTS

| 3,579,004 | A | * | 5/1971 | Patrick et al. | 310/164 |
| 4,560,226 | A | * | 12/1985 | Dennis | 439/395 |
| 4,781,618 | A | * | 11/1988 | Geib et al. | 439/392 |
| 5,001,379 | A | * | 3/1991 | Katayama | 310/194 |
| 5,399,097 | A | * | 3/1995 | Sakai et al. | 439/395 |
| 5,489,223 | A | * | 2/1996 | Faje et al. | 439/748 |
| 5,952,760 | A | * | 9/1999 | Miyazawa et al. | 310/194 |
| 6,400,132 | B1 | * | 6/2002 | Koumura | 324/146 |
| 6,541,889 | B1 | * | 4/2003 | Moroto et al. | 310/216 |
| 6,861,776 | B1 | * | 3/2005 | Hashimoto | 310/71 |
| 2001/0002776 | A1 | * | 6/2001 | Suzuki et al. | 310/71 |

FOREIGN PATENT DOCUMENTS

JP    7-111749    4/1995

OTHER PUBLICATIONS

Patent Abstract of Japan 7-111749 published Apr. 25, 1995.

* cited by examiner

*Primary Examiner*—Darren Schuberg
*Assistant Examiner*—David W. Scheuermann
(74) *Attorney, Agent, or Firm*—Ladas & Parry LLP

(57) ABSTRACT

The present invention relates to a motor that allows connection terminals to be stably fastened to a bobbin. The motor includes at least one lead wire wound around a bobbin of a stator to form a coil, at least one power line electrically connected to the lead wire to supply power to the lead wire, at least one connection terminal to connect the lead wire to the power line, a terminal holding part provided at a portion of the bobbin to place the connection terminal, at least one terminal receiving hole provided in the terminal holding part to allow the connection terminal connected to the power line to be inserted and connected to the lead wire, and a fastening member to accommodate the connection terminal connected to the power line therein and to be fastened to the terminal holding part so as to keep the connection terminal mounted in the terminal receiving hole.

10 Claims, 5 Drawing Sheets

MOTOR

CROSS-REFERENCE TO RELATED APPLICATION

This application claims the benefit of Korean Patent Application No. 2003-85709, filed on Nov. 28, 2003 in the Korean Intellectual Property Office, the disclosure of which is incorporated herein by reference.

BACKGROUND OF THE INVENTION

1. Field of the Invention

The present invention relates generally to a motor and, more particularly, to a motor that allows connection terminals to be kept stably fastened to a bobbin.

2. Description of the Related Art

Generally, a motor is an apparatus that is supplied with power and generates a rotating force. A conventional motor includes a stator provided with wound coils and a rotor placed in the stator and provided with permanent magnets therein, so that, when power is applied to the stator, a magnetic field is generated, and thus the rotor is rotated in the stator and generates a rotating force.

In the conventional motor, the stator is configured in such a way that coils are formed by winding lead wires around teeth parts protruded to an interior of the cylindrical-shaped bobbin so that the magnetic field is generated as the power is applied.

Connection terminals are provided to electrically connect power lines and the lead wires to transmit the power to the lead wires, and terminal receiving holes are provided at the bobbin to accommodate and fasten the connection terminals. The power lines and the lead wires are connected to each other in such a way that the lead wires are placed in the terminal receiving holes, the power lines are connected to the connection terminals, and the connection terminals are tightly fitted into the terminal receiving holes.

However, the conventional motor is problematic in that, since the connection terminals are tightly fitted into and fastened in the terminal receiving holes, a large amount of force is required when the connection terminals are placed and fastened in the terminal receiving holes, and the connection terminals may be separated from the terminal receiving holes by vibrations generated from the motor when the motor is used for a long time.

SUMMARY OF THE INVENTION

Accordingly, it is an aspect of the present invention to provide a motor that enables connection terminals to be easily fastened to a bobbin and allows connection terminals to be kept stably fastened to the bobbin.

Additional aspects and/or advantages of the invention will be set forth in part in the description which follows and, in part, will be obvious from the description, or may be learned by practice of the invention.

The above and/or other aspects are achieved by providing a motor including at least one lead wire wound around a bobbin of a stator to form a coil, at least one power line electrically connected to the lead wire to supply power to the lead wire, at least one connection terminal to connect the lead wire to the power line, a terminal holding part provided at a portion of the bobbin to place the connection terminal, at least one terminal receiving hole provided in the terminal holding part to allow the connection terminal connected to the power line to be inserted and connected to the lead wire, and a fastening member to accommodate the connection terminal connected to the power line therein and to be fastened to the terminal holding part so as to keep the connection terminal mounted in the terminal receiving hole.

A first locking lug may be formed on one of the fastening member and the terminal holding part, and a fastening hook may be formed on a remaining one of the fastening member and the terminal holding part to be caught by the first locking lug and thus allow the fastening member to be fastened to the terminal holding part.

The connection terminal may include a fastening part provided at a first side thereof to surround an outside of a covering of the power line and to allow the power line to be fastened to the connection terminal, a connection part provided at the first side thereof to surround an outside of the power line without the covering and to allow the connection terminal and the power line to be connected to each other, and a connection slot provided at a second side thereof to cut an insulation coating of the lead wire and to allow the lead wire to be inserted thereto and fastened therein.

The connection slot may be constructed in such a way that a width of the slot is reduced from an end thereof, so that the connection slot has a smaller width than a diameter of the lead wire.

The fastening member may be opened at a side thereof, be provided with locking lugs to allow the connection terminal to be inserted and accommodated therein, and be provided with at least one fastening slot at an opposite side thereof to have a predetermined width, and to allow the lead wire placed in the terminal receiving hole to pass therethrough and be connected to the connection terminal accommodated in the fastening member.

The fastening member may be provided with a cover at the opened side thereof to close opened portion of the fastening hole of the fastening member, and the cover may be provided with at least one power line hole to allow the power line to pass therethrough and to be connected to the connection terminal placed in the fastening member.

The fastening hole may include a plurality of the fastening holes formed in the fastening member to allow a plurality of connection terminals to be inserted thereto and fastened therein, and the cover may be configured to close all of the plurality of fastening holes.

A second locking lug may be formed on one of the fastening member and the cover, and a second fastening hook may be formed on a remaining one of the fastening member and the cover to be caught by and locked in the second locking lug and thus allow the fastening member to be fastened to the cover.

BRIEF DESCRIPTION OF THE DRAWINGS

These and other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
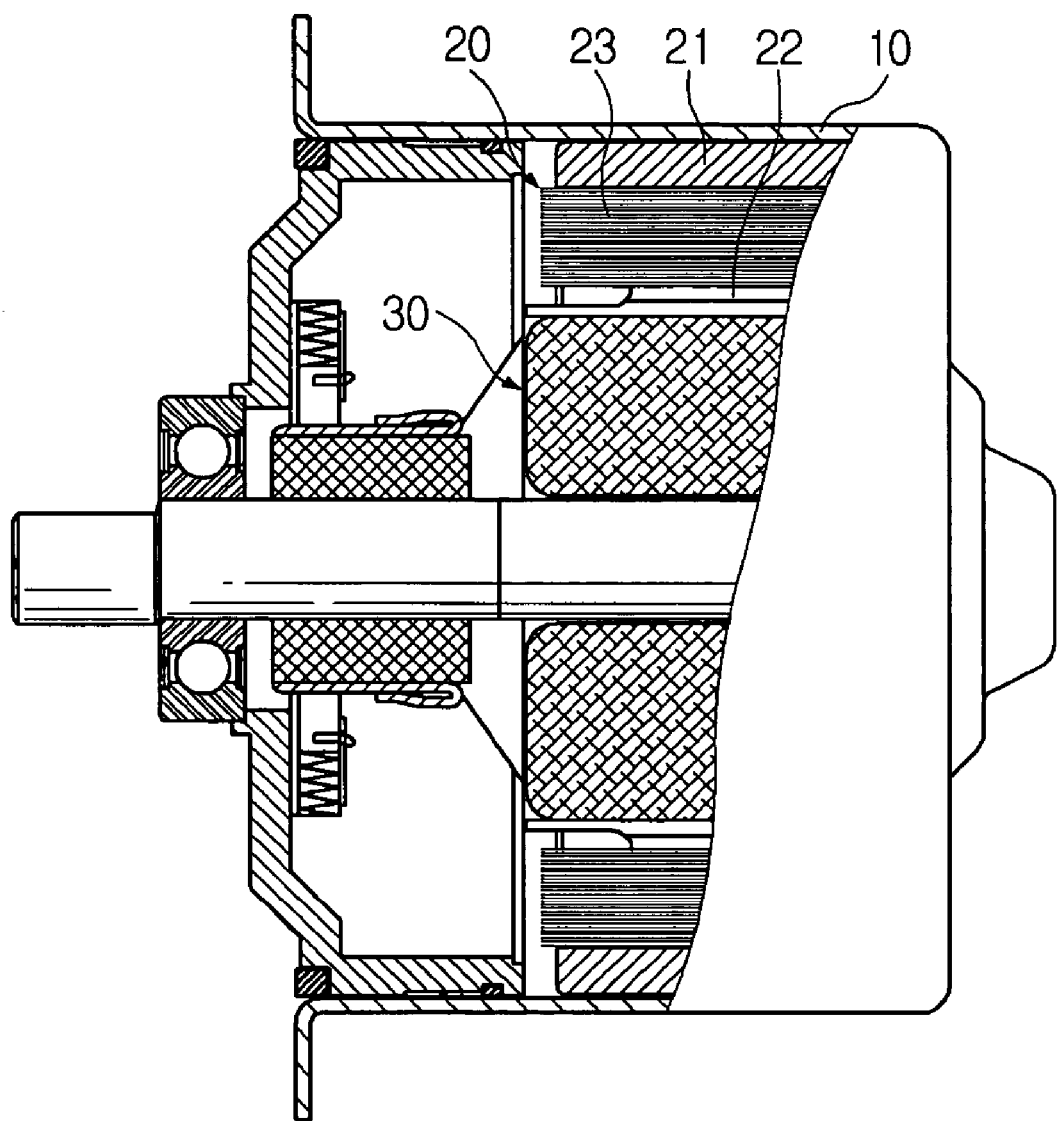
FIG. 1 is a sectional view of a motor, according to the present invention.

Reference will now be made in detail to the present preferred embodiments of the present invention, examples of which are illustrated in the accompanying drawings, wherein like reference numerals refer to like elements throughout.

As shown in FIG. 1, a motor of the present invention includes a stator 20 provided with a wound coil 23 in a casing 10 forming an appearance, and a rotor 30 placed to be rotated and provided with a magnet 31 to interact with a magnetic field generated from the stator 20 and generate a rotating force as power is applied.

Figure 2:
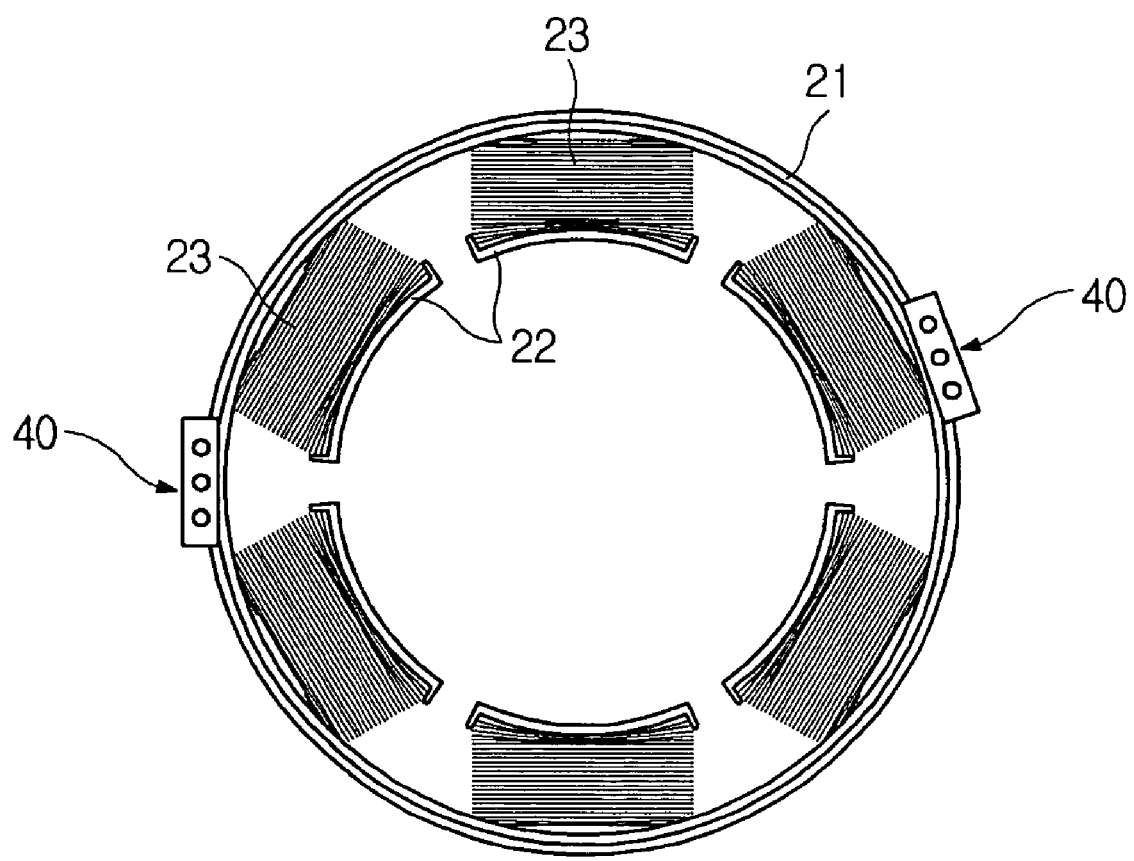
FIG. 2 is a view showing a stator of the motor of the present invention.
Figure 3:
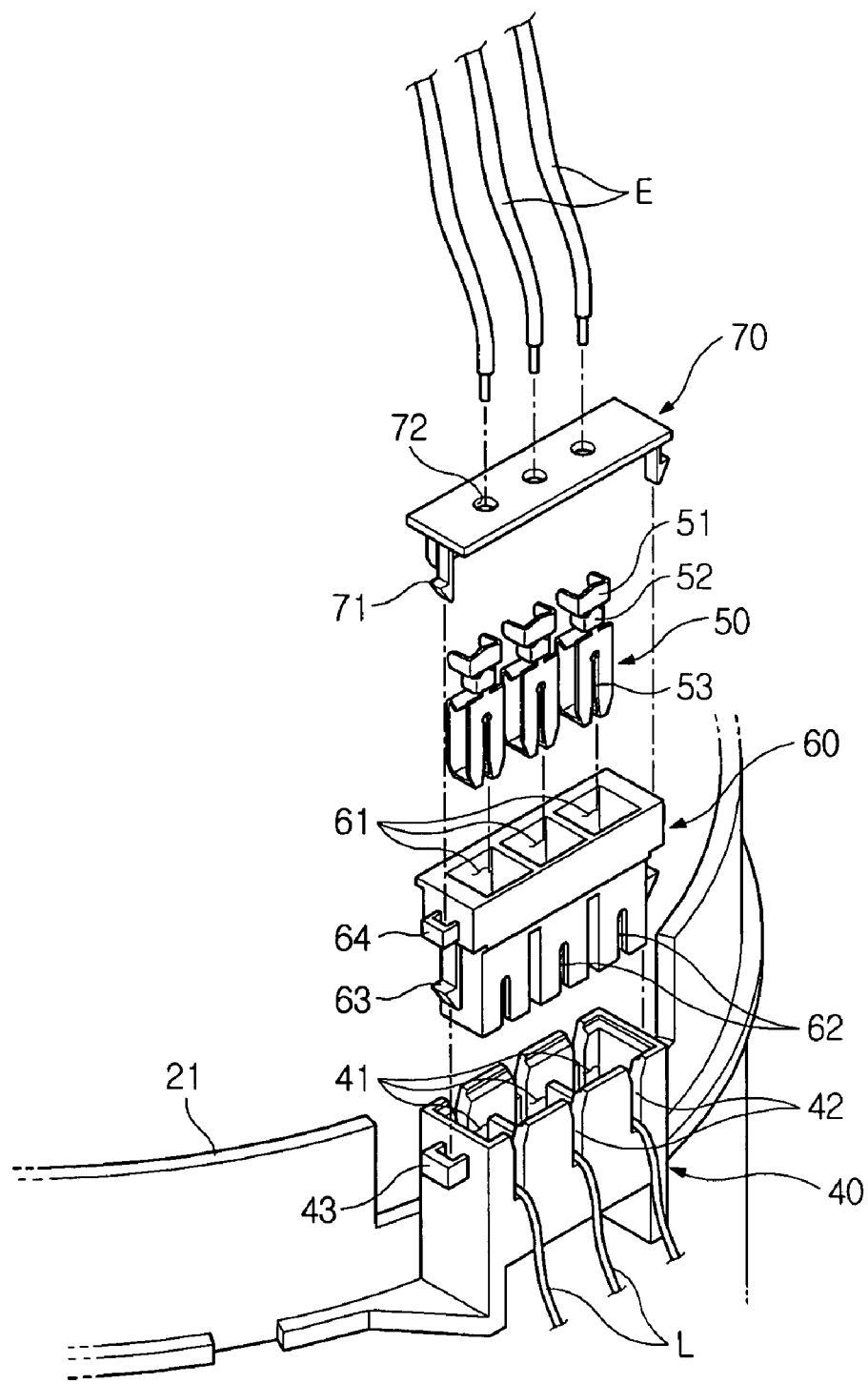
FIG. 3 is an exploded perspective view showing connection terminals mounted in the motor of the present invention.

As shown in FIG. 2, the stator 20 includes a bobbin cylindrically molded, and a plurality of teeth parts 22 extended to an inside of the bobbin 21. A lead wire L (see FIG. 3) is wound around each of the teeth parts 22 to form the coil 23 so that the coil 23 generates a magnetic field as power is applied.

Lead wires L are connected to power lines E, respectively, to receive power. For this purpose, the motor of the present invention includes connection terminals 50 to electrically connect the lead wires L to the power lines E, respectively, and a terminal holding part 40 is protruded from a portion of an outer surface of the bobbin 21 to accommodate the connection terminals 50 and allow the lead wires L and the power lines E to be kept stably connected to each other by the connection terminals 50.

In the terminal holding part 40, a plurality of terminal receiving holes 41 are formed to be depressed to a certain depth so as to allow the connection terminals 50 to be inserted and mounted therein, and a plurality of lead wire mounting slots 42 are provided to pass ends of the lead wires L wound around the teeth parts 22 through the terminal holding part 40 in a radial direction so as to allow the ends of the lead wires L to pass through the terminal holding part 40 and protrude to an outside of the terminal holding part 40. In the present embodiment, three terminal receiving holes 41 are arranged to be aligned with each other in the terminal holding part 40 so as to allow three lead wires L to be connected to three connection terminals 50, respectively.

The connection terminals 50 are connected to the lead wires L and the power lines E, and allow the power lines E and the lead wires L to be electrically connected to each other. At a first side of each of the connection terminals 50, a fastening part 51 to surround an outside of insulating covering of the power line L and fasten the power line E to the connection terminal 50, and a connection part 52 to surround an outside of the power line L without a covering and connect the power line E to the connection terminal 50 are arranged to be aligned with each other. At a second side of each of the connection terminals 50, a connection slot 53 is placed to remove an insulation coating thinly coated on the lead wire L so as to allow the lead wire L to be electrically connected to the connection terminal 50, and to receive the lead wire L to be inserted therein so as to allow the lead wire L to be fastened to the connection terminal 50. In this case, the connection slot 53 is constructed so that a width thereof is gradually reduced from an end thereof so that a width of a center portion thereof is smaller than a diameter of a lead wire L so as to remove the insulation coating of the lead wire L and allow the lead wire L to be inserted into the connection slot 52 at a same time.

The motor of the present invention further includes a fastening member 60 to easily mount the connection terminals 50 in the terminal holding part 40 and keep the connection terminals 50 stably fastened to the terminal holding part 40.

The fastening member 60 is opened at a first side, and is provided with fastening holes 61 in the opened first side thereof. Fastening slots 62 each having a predetermined width are provided at a second side of the fastening member 60 to allow the connection terminals 50 accommodated in the fastening holes 61 to be connected to the lead wires L placed in the terminal receiving holes 41 through the connection slots 53, respectively. In the present embodiment, three fastening holes 61 are provided in the fastening member 60 to allow three connection terminals 50 to be simultaneously connected to three lead wires L, respectively.

Furthermore, first fastening hooks 63 are protruded from both side ends of the fastening member 60, and first locking lugs 43 are formed on the terminal holding part 40 at locations corresponding to those of the first fastening hooks 63 to allow the first fastening hooks 63 to be caught by and locked in the first locking lugs 43. Accordingly, the first fastening hooks 63 are caught by and locked in the first locking lugs 43, so that the fastening member 60 is fastened to the terminal holding part 40, and thus the fastening member 60 is not separated from the terminal holding part 40.

Meanwhile, a cover 70 is provided at the opened side of the fastening member 60 to close the opened side of the fastening member 60 so as to prevent the connection terminals 50 from being separated from the fastening member 60. Second fastening hooks 41 are formed to be protruded from both side ends of the cover 70 to allow the cover 70 to be fastened to the fastening member 60, and hook-shaped second locking lugs 64 are formed on the fastening member 60 at locations corresponding to those of the second fastening hooks 71 to allow the second fastening hooks 71 to be caught by and locked in the second locking lugs 64. Accordingly, the second fastening hooks 71 are caught by and locked in the second locking lugs 64, so that the cover 70 is fastened to the fastening member 60, and thus the connection terminals 50 placed in the fastening member 60 are not separated from the fastening member 60. Furthermore, power line holes 72 are formed in the cover 70 to allow the power lines E to pass therethrough and to be fastened to the connection terminals 50 placed in the fastening member 60.

In the present embodiment, the first locking lugs 43 are provided on the terminal holding part 40 and the first fastening hooks 63 are provided on the fastening member 60. However, the present invention is not limited to the embodiment, and it is possible that the first fastening hooks 63 are provided on the terminal holding part 40 and the first locking lugs 43 are provided on the fastening member 60.

Furthermore, in the embodiment of the present invention, the second locking lugs 64 are provided on the fastening member 60 and the second fastening hooks 71 are provided on the cover 70. However, the present invention is not limited to the embodiment, and it is possible that the second fastening hooks 71 are provided on the fastening member 60 and the second locking lugs 64 are provided on the cover 70.

A process of connecting the lead wires and power lines of the motor and effects thereof according to the present invention are described with reference to the drawings below.

The power lines E are passed through the power line holes 72 of the cover 70, coverings of ends of the power lines E are removed, the covering-free ends of the power lines E are fastened to the connection parts 52, and portions of the power lines E with the coverings are fastened to the fastening part 51, so that the power lines E are electrically connected and fastened to the connection terminals 50.

The connection terminals 50 connected to the power lines E are inserted into the fastening holes 61 of the fastening member 60, and the opened side of the fastening member 60 is closed by the cover 70. In this case, the fastening member 60 and the cover 70 are fastened to each other by the second locking lugs 64 and the second fastening hooks 71, so that the connection terminals 50 are not separated from the fastening member 60. In the present embodiment, a plurality of the connection terminals 50 are placed in a plurality of the fastening holes 61 provided in the fastening member 60, respectively, and opened side of the fastening holes 61 is closed by the single cover 70.

Figure 4:
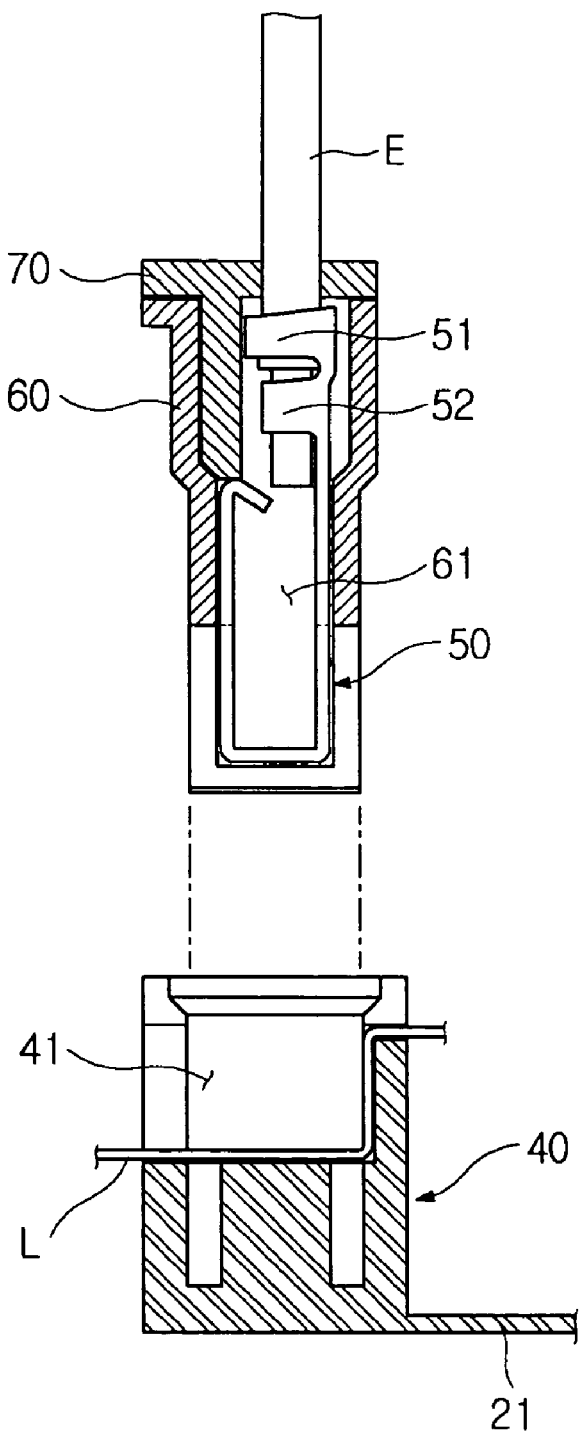
FIG. 4 is a sectional view showing a fastening member with a connection terminal separated from a terminal holding part.
Figure 5:
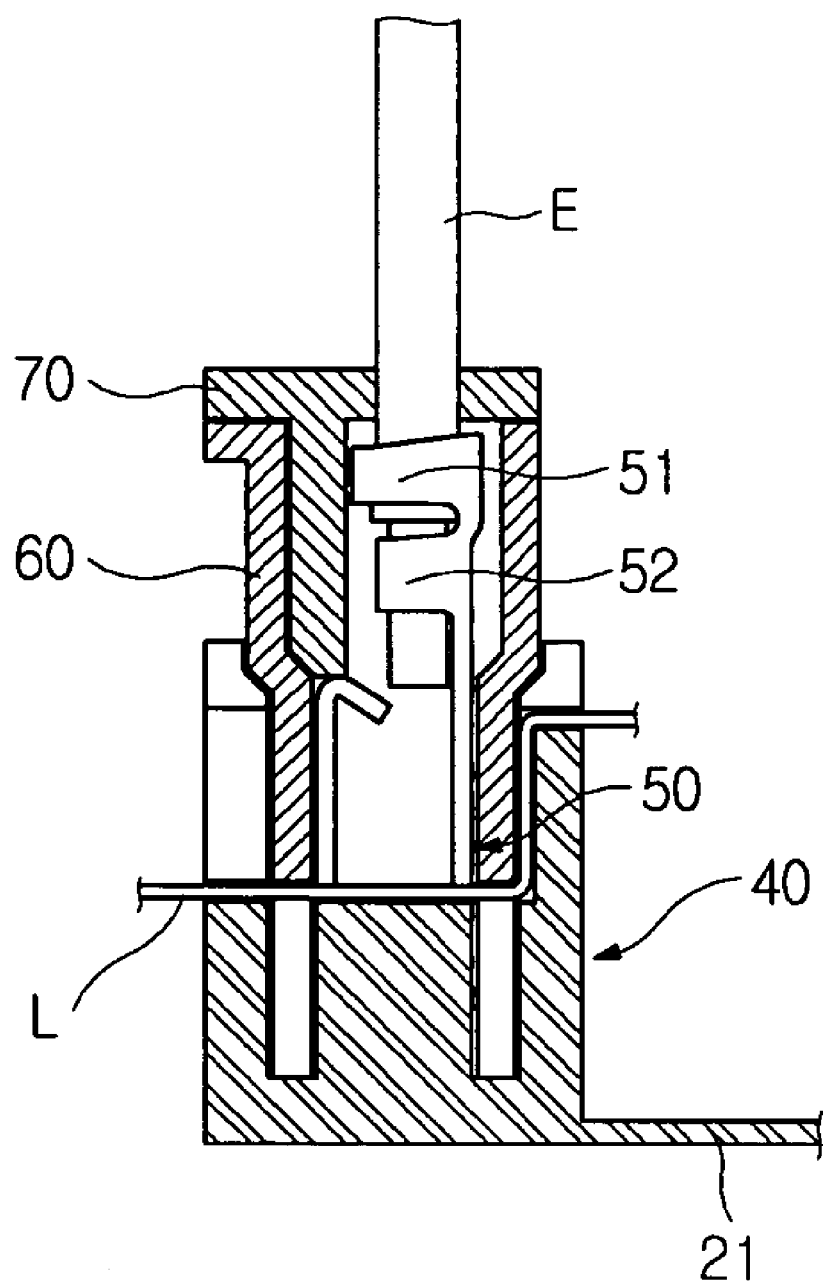
FIG. 5 is a sectional view showing the fastening member with the connection terminal mounted in the terminal holding part.

Meanwhile, ends of the lead wires L wound around the teeth parts 22 are passed through the lead wire mounting slots 42, respectively, provided in the terminal holding part 40 so that the ends of the lead wires L are protruded to the outside of the terminal holding part 40, and thus each of the lead wires L is located through a center portion of each of the terminal receiving holes 41, as shown in FIG. 4.

When the fastening member 60 with the connection terminals 50 is inserted into the terminal receiving holes 41, the lead wires L placed in the terminal receiving holes 41 are accommodated in the connection slots 53 by the fastening slots 62, respectively. In this case, a width of a connection slot 53 is reduced so that a diameter of a center portion of the connection slot 53 is smaller than a diameter of a lead wire L, so that an insulation coating of the lead wire L to cover a surface of the lead wire L is removed while being inserted into the connection slot 53. Accordingly, the connection terminals 50 and the lead wires L are electrically connected to each other, and lead wires L are inserted into and fastened in the connection slots 53.

As described in detail above, a fastening member with connection terminals is fastened to a terminal holding part by first locking lugs and fastening hooks, so that a motor of the present invention is advantageous in that the connection terminals are prevented from being separated from terminal receiving holes.

Furthermore, a plurality of the connection terminals to which a plurality of power lines are connected, respectively, are accommodated in and fastened to the single fastening member, the fastening member is fastened to the terminal holding part, and the connection terminals and the lead wires are simultaneously connected and fastened, so that the motor is advantageous in that the plurality of power lines are simply connected to lead wires.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A, motor, comprising:
   at least one lead wire wound around a bobbin of a stator to form a coil;
   at least one power line electrically connected to the lead wire to supply power to the lead wire;
   at least one connection terminal to connect the lead wire to the power line;
   a terminal holding part provided at a portion of the bobbin to place the connection terminal;
   at least one terminal receiving hole provided in the terminal holding part to allow the connection terminal connected to the power line to be inserted and connected to the lead wire;
   a fastening member to accommodate the connection terminal connected to the power line therein and to be fastened to the terminal holding part so as to keep the connection terminal mounted in the terminal receiving hole, a first locking lug formed on one of the fastening member and the terminal holding part, and a fastening hook formed on a remaining one of the fastening member and the terminal holding part to be caught by the first locking lug and thus allow the fastening member to be fastened to the terminal holding part.

2. A motor, comprising:
   at least one lead wire wound around a bobbin of a stator to form a coil;
   at least one power line electrically connected to the lead wire to supply power to the lead wire;
   at least one connection terminal to connect the lead wire to the power line;
   a terminal holding part provided at a portion of the bobbin to place the connection terminal;
   at least one terminal receiving hole provided in the terminal holding part to allow the connection terminal connected to the power line to be inserted and connected to the lead wire; and
   a fastening member to accommodate the connection terminal connected to the power line therein and to be fastened to the terminal holding part so as to keep the connection terminal mounted in the terminal receiving hole, wherein the connection terminal comprises:
   a fastening part provided at a first side thereof tosurround an outside of a covering of the power line and to allow the power line to be fastened to the connection terminal
   a connection part provided at the first side thereof to surround an outside of the power line without the covering and to allow the connection terminal and the power line to be connected to each other; and
   a connection slot provided at a second side thereof to cut an insulation coating of the lead wire and to allow the lead wire to be inserted thereto and fastened therein.

3. The motor as set forth in claim 2, wherein the connection slot is constructed in such a way that a width of the slot is reduced from an end thereof, so that the connection slot has a smaller width than a diameter of the lead wire.

4. A motor, comprising:
   at least one lead wire wound around a bobbin of a stator to form a coil;
   at least one power line electrically connected to the lead wire to supply power to the lead wire;
   at least one connection terminal to connect the lead wire to the power line;
   a terminal holding part provided at a portion of the bobbin to place the connection terminal;
   at least one terminal receiving hole provided in the terminal holding part to allow the connection terminal connected to the power line to be inserted and connected to the lead wire;
   and a fastening member to accommodate the connection terminal connected to the power line therein and to be fastened to the terminal holding part so as to keep the connection terminal mounted in the terminal receiving hole, wherein the fastening member is opened at a side thereof, is provided with fastening holes to allow the connection terminal to be inserted and accommodated therein, and is provided with at least one fastening slot at an opposite side thereof to have a predetermined width, and to allow the lead wire placed in the terminal receiving hole to pass therethrough and be connected to the connection terminal accommodated in the fastening member.

5. The motor as set forth in claim 4, wherein: the fastening member is provided with a cover at the opened side thereof to close opened portion of the fastening hole of the fastening member: and the cover is provided with at least one power line hole to allow the power line to pass therethrough and to be connected to the connection terminal placed in the fastening member.

6. The motor as set forth in claim 5, wherein: the fastening hole comprises a plurality of the fastening holes formed in the fastening member to allow a plurality of connection terminals to be inserted thereto and fastened therein; and the cover is configured to close all of the plurality of fastening holes.

7. The motor as set forth in claim 5, wherein:

a locking lug is formed on one of the fastening member and the cover; and a second fastening hook is formed on a remaining one of the fastening member and the cover to be caught by and locked in the second locking lug and thus allow the fastening member to be fastened to the cover.

8. The motor as set forth in claim 1 wherein the bobbin includes a protruding portion which forms said terminal holding part.

9. The motor as set forth in claim 2, wherein:

a first locking lug is formed on one of the fastening member and the terminal holding part, and a fastening hook is formed on a remaining one of the fastening member and the terminal holding part to be caught by the first locking lug and thus allow the fastening member to be fastened to the terminal holding part.

10. The motor as set forth in claim 4, wherein:

a first locking lug is formed on one of the fastening member and the terminal holding part, and a fastening hook is formed on a remaining one of the fastening member and the terminal holding part to be caught by the first locking lug and thus allow the fastening member to be fastened to the terminal holding part.

* * * * *